(12) United States Patent
Batterham et al.

(10) Patent No.: US 6,565,070 B2
(45) Date of Patent: May 20, 2003

(54) REACTOR

(76) Inventors: Robin John Batterham, 161 Beach Road, Sandringham 3198 (AU); Warwick Arthur Hoffmann, 51 Livingstone Street, Ivanhoe 3079 (AU); Nicholas Katsikaros, 4/9 Anderson Street, Heidelberg 3084 (AU)

(*) Notice: Subject to any disclaimer, the term of this patent is extended or adjusted under 35 U.S.C. 154(b) by 0 days.

(21) Appl. No.: 09/972,688

(22) Filed: Oct. 5, 2001

(65) Prior Publication Data

US 2002/0033543 A1 Mar. 21, 2002

Related U.S. Application Data

(63) Continuation of application No. 09/771,748, filed on Jan. 29, 2001, now abandoned, which is a continuation of application No. 09/535,332, filed on Mar. 27, 2000, now abandoned, which is a continuation of application No. 08/115,398, filed on Sep. 1, 1993, now abandoned, which is a continuation of application No. 07/917,585, filed on Jul. 21, 1992, now abandoned.

(30) Foreign Application Priority Data

Dec. 2, 1991 (AU) .............................................. PK 9791

(51) Int. Cl.⁷ ................................................. B01F 3/04
(52) U.S. Cl. ......................... 261/36.1; 261/77; 261/93; 261/DIG. 75
(58) Field of Search ........................... 261/36.1, 76, 77, 261/84, 91, 93, DIG. 75

(56) References Cited

U.S. PATENT DOCUMENTS

| | | |
|---|---|---|
| 897,735 A | 9/1908 | Golderg |
| 1,808,956 A | 6/1931 | Ketterer |
| 2,077,445 A | 4/1937 | Wallace et al. |
| 2,293,183 A | 8/1942 | Walker |
| 3,202,281 A | 8/1965 | Weston |
| 3,350,302 A | 10/1967 | Demeter et al. |
| 3,371,618 A | 3/1968 | Chambers |
| 3,400,818 A | 9/1968 | Tarjan |
| 3,592,586 A | 7/1971 | Scott |
| 3,643,403 A | 2/1972 | Speece |
| 3,671,022 A | 6/1972 | Laird et al. |
| 3,680,698 A | 8/1972 | Liu et al. |
| 3,723,545 A | 3/1973 | Nagel et al. |
| 3,932,275 A | 1/1976 | Mewes et al. |
| 4,000,227 A | 12/1976 | Garrett |
| 4,017,565 A | 4/1977 | Muller |
| 4,051,204 A | 9/1977 | Muller et al. |
| 4,196,074 A | 4/1980 | Garrett et al. |
| 4,259,267 A | 3/1981 | Wang |
| 4,267,052 A | 5/1981 | Chang |
| 4,290,885 A | 9/1981 | Kwak |
| 4,465,597 A | 8/1984 | Herman et al. |
| 4,483,826 A | 11/1984 | Louthan |
| 4,708,829 A | 11/1987 | Bylehn et al. |
| 4,743,405 A | 5/1988 | Durao et al. |
| 4,931,225 A | 6/1990 | Cheng |
| 5,043,104 A | 8/1991 | Stirling |

FOREIGN PATENT DOCUMENTS

| | | |
|---|---|---|
| EP | 0224801 | 6/1987 |
| EP | 0225237 | 6/1987 |
| EP | 0302708 | 2/1989 |
| GB | 1405264 | 9/1975 |
| GB | 1549523 | 8/1979 |
| GB | 2013095 | 8/1979 |

*Primary Examiner*—C. Scott Bushey
(74) *Attorney, Agent, or Firm*—Merchant & Gould, P.C.

(57) ABSTRACT

A reactor for aerating a fluid with a gas comprises a mixing tank (12) for the fluid and a centrally located vertical draft tube (13) submerged in the fluid to divide the mixing tank (12) into an inner chamber (21) and an outer chamber (23). The reactor further comprises a motor driven axial flow impeller (14) located in the draft tube (13) for circulating fluid downwardly through the inner chamber (21) and upwardly through the outer chamber (23). The reactor further comprises an external circuit for withdrawing a portion of the fluid from the mixing tank (12), aerating the fluid, and returning the aerated fluid to the mixing tank (12). The aerator is in the form of a venturi device (17).

16 Claims, 2 Drawing Sheets

REACTOR

This application is a continuation of application Ser. No. 09/771,748; filed on Jan. 29, 2001 which is continuation of Ser. No. 09/535,332, filed on Mar. 27, 2000, which is a continuation application under 37 CFR §1.53(b) of Ser. No. 08/115,398, filed on Sep. 1, 1993 which is a File Wrapper Continuation application of Ser. No. 07/917,585, filed Jul. 21, 1992, which applications are incorporated herein by reference and, which are all now abandoned.

FIELD OF THE INVENTION

The invention relates to a reactor for a two-phase or three-phase system.

The invention has particular application to the aeration of a fluid comprising a slurry of mineral particles with air or any other suitable oxygen-containing gas, as is required by way of example in aerobic bacterial leaching. However, the invention is not restricted to this application and extends to the aeration of any gas/liquid, gas/liquid/solid, or gas/liquid/solid/microbial systems.

The invention has the advantages of aerating a fluid with a gas at low energy usage and with high efficiency in terms of gas utilisation.

The term "aeration" is understood to mean herein the introduction of a gas or gases into a fluid.

BACKGROUND OF THE INVENTION

Reactors for aeration of slurries have been in use for many years in the mining industry. The two major types of reactors are the Pachuca (or air agitated reactor) and the mechanically agitated reactor.

The Pachuca reactor was initially favoured due to its simplicity of construction and operation but gradually lost favour as reactor size increased. The loss of favour resulted from the large amounts of compressed air required for good mineral suspension. Also, the residence time of air in a Pachuca reactor is too short for efficient mass transfer and Pachuca reactors are prone to channelling of the air. Air agitation, in general, is inefficient because the bubble size for efficient agitation is too large for efficient mass transfer.

Mechanical agitation has become more widely used, particularly for large reactors, as impeller design has become more efficient and it has become evident that the extra capital cost was more than compensated for by the relatively lower energy required for agitation.

For efficient mass transfer of air to solution it is necessary to obtain a fine dispersion of bubbles in a well mixed system with the bubbles having a long residence time in the reactor. In practice this has been obtained by passing the air through a high shear turbine impeller or by introducing the air through a membrane or porous diffuser. Both these methods are energy intensive, because the air must be introduced at sufficient over-pressures to overcome the liquid pressure at the point of injection and to overcome the pressure drop across the injection opening, membrane or diffuser. Usually, the point of injection is at the bottom of the reactor and, in particular, in the case of aerating large vessels, one of the major costs is the capital and on-going energy costs to compress the air to the pressure required for injection. If the tanks are deeper than about 10 m it is necessary to install expensive, high pressure, compressors rather than air blowers. Additionally, the use of porous diffusers, or spargers, in reactors for slurries can lead to loss of operating time to unblock the diffusers.

In addition, mechanically agitated reactors become inefficient when large amounts of air are required, because the power required to disperse the air in the reactors becomes very large. Further, in the case of bacterial reactors, the shear forces present at the blade tips of high speed impellers can damage the bacteria.

In addition, particularly for gas/liquid/solid systems where it is important to maintain the solids in suspension, the power required to circulate the fluid in the aerator becomes a significant cost factor.

SUMMARY OF THE INVENTION

According to the invention there is provided a reactor for introducing a gas into a fluid comprising, a mixing tank for the fluid, a partition means for dividing the tank into at least two chambers and for allowing the fluid to flow between the chambers at a lower region and an upper region of the tank, a pump means located in one of the chambers for circulating the fluid downwards in one chamber and then upwards in the other chamber, a means for creating a region of reduced pressure in a portion of the fluid, a means for introducing the gas into the fluid in the region of reduced pressure to aerate the fluid, and a means for introducing the aerated fluid into the circulating fluid in the tank.

It is preferred that the partition means comprises a draft tube adapted to be submerged in the fluid in the tank, the draft tube having an open upper end and an open lower end.

It is preferred particularly that the tank be cylindrical and the draft tube be located centrally in the tank to divide the tank into an inner chamber and an outer annular chamber.

It is preferred that the pump means be located in the draft tube.

It is preferred that the pump means comprises an axial flow pump.

It is preferred particularly that the axial flow pump comprises an impeller located in the draft tube.

It is preferred that the means for creating the region of reduced pressure in the fluid comprises a tubular member which has a region of restricted cross-section for imparting a venturi effect to the fluid passing through the tubular body whereby the velocity of the fluid increases and the pressure of the fluid decreases in the region of restricted cross-section.

In one preferred arrangement the region of restricted cross-section is formed by providing a throat in the tubular member. In another preferred arrangement the region of restricted cross-section is formed by inserting a restriction in the tubular member.

It is preferred that the means for introducing the gas into the fluid comprises a porous membrane, holes, or jets.

According to the invention there is also provided a method of introducing a gas into a fluid comprising, circulating the fluid by means of a pump means in a mixing tank having at least two chambers that are in fluid communication at upper and lower regions of the tank so that the fluid flows downwards in one chamber and upwards in the other chamber, creating a region of reduced pressure in a portion of the fluid, introducing the gas into the portion of the fluid in the region of reduced pressure to aerate the fluid, and introducing the aerated fluid into the circulating fluid in the tank.

DESCRIPTION OF THE DRAWINGS

The invention is described further with reference to the accompanying drawings in which.

DETAILED DESCRIPTION OF THE INVENTION

The preferred embodiment of the reactor of the invention is described herein in relation to the aeration of a slurry of a mineral and water with air. However, it is noted that the invention is not restricted to this application and extends to the aeration of any fluid with or without suspended solids.

Figure 1:
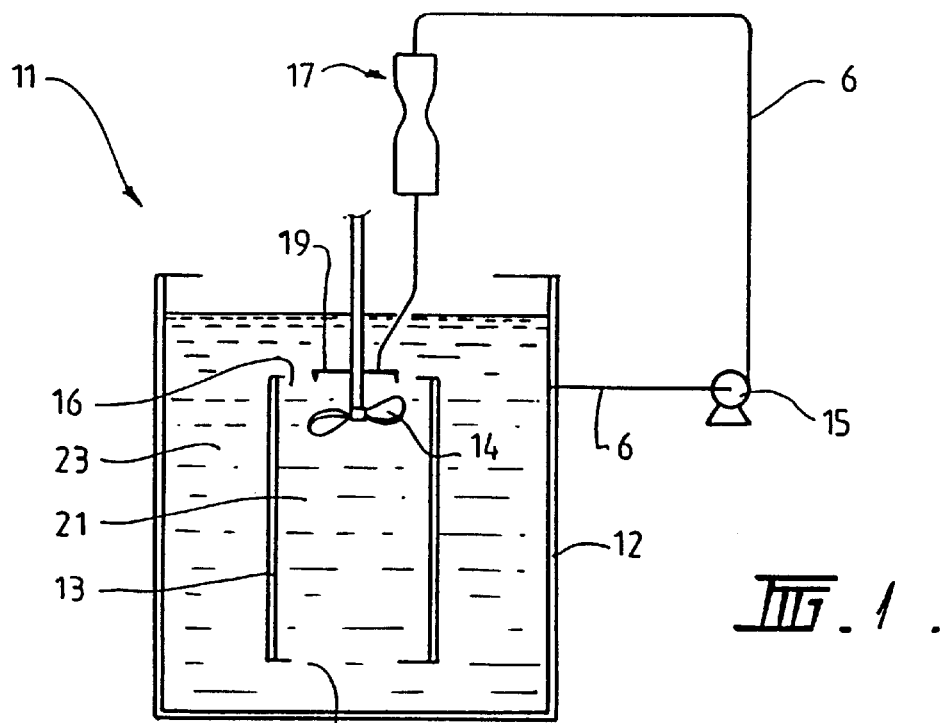
FIG. 1 represents schematically a preferred embodiment of a reactor formed in accordance with the invention.

The reactor 11 shown in FIG. 1 comprises a mixing tank 12 containing the slurry, a vertical draft tube 13 submerged in the slurry, and a motor driven axial flow impeller 14 located in the draft tube 13 near the top thereof. The tank 12 may be of any suitable size. The draft tube 13 has open upper and lower ends 16, 18 and is located centrally in the mixing tank 12 to divide the mixing tank 12 into an inner chamber 21 and an outer annular chamber 23. In use, the impeller 14 induces flow of the slurry downwards in the draft tube 13 and then upwards in the outer annular chamber 23. The flow of the slurry is controlled so that the mineral particles are kept in suspension.

The reactor 11 further comprises an external circuit for withdrawing a portion of the slurry from the mixing tank 12, aerating the slurry, and returning the air-enriched slurry to the mixing tank 12. The external circuit comprises a recycle line 6, a pump 15 for pumping the slurry around the external circuit, and a venturi device 17 for aerating the slurry. The external circuit is arranged to withdraw slurry from an upper section of the mixing tank 12 and to return the air-enriched slurry to a location in the draft tube 13 above the impeller 14 to optimise mixing of the air-enriched slurry with the circulating slurry in the mixing tank 12. The external circuit comprises at least one re-entry nozzle 19 arranged to direct the air-enriched slurry down the draft tube 13.

Figures 2, 3:
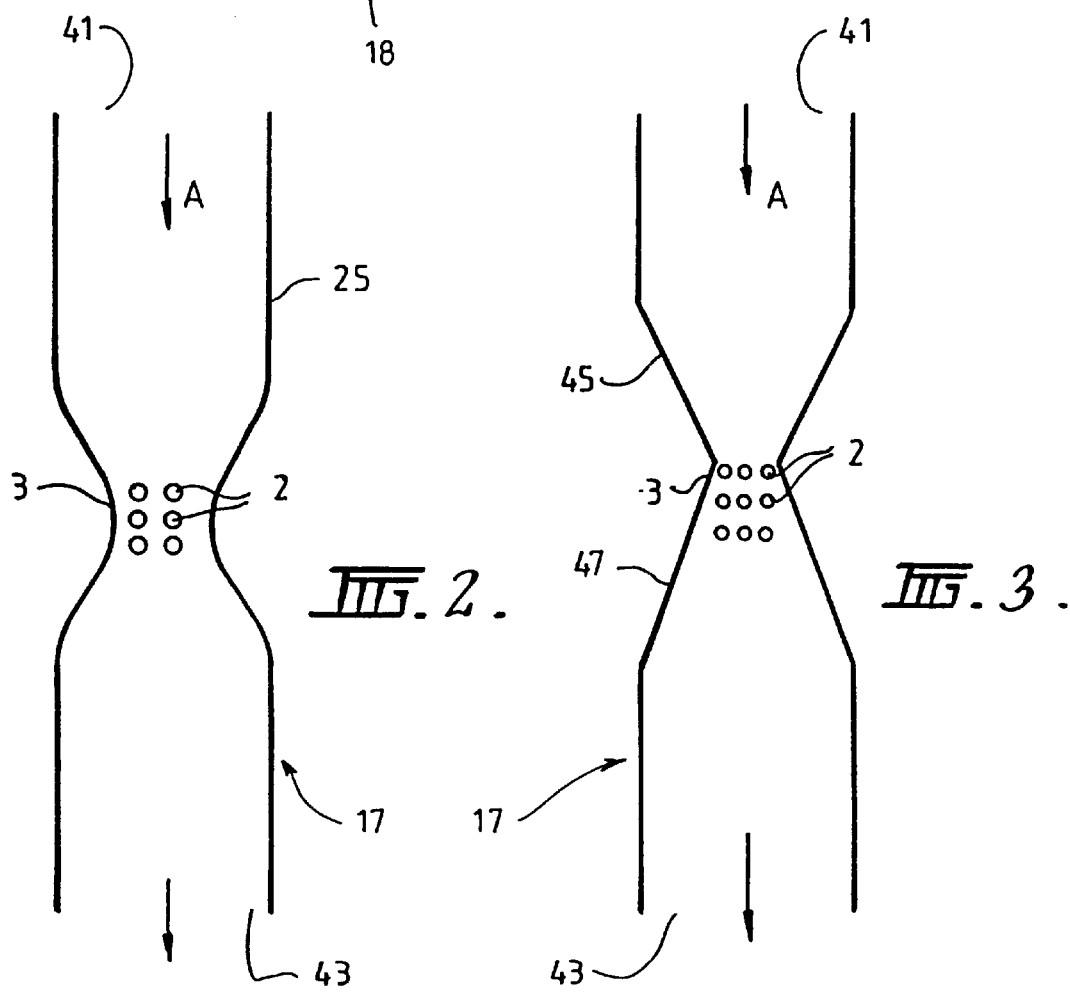
FIG. 2 is a detailed schematic representation of the basic design of a venturi device for use in the reactor shown in FIG. 1.
FIG. 3 is a detailed schematic representation of a preferred embodiment of a venturi device for use in the reactor shown in FIG. 1.

FIG. 2 illustrates the basic design features of the venturi device 17. With reference to the figure, the venturi device 17 comprises a tubular body 25 having an inlet end 41, an outlet end 43, and an intermediate throat 3 which defines a region of restricted cross-section in which there are holes 2 for introducing air for mixing with the slurry. As the slurry flows through the tubular body 25 in the direction indicated by the arrow A the flow rate increases as the slurry enters the throat 3 thereby creating a region of reduced pressure according to Bernoulli's equation. As a consequence, in order to introduce air into the region of reduced pressure it is not necessary that the air be at high pressure and the air can be introduced at low pressure or by natural aspiration. As the slurry flows from the throat 3 the slurry enters a region of increased cross-section 5 where the fluid velocity decreases and the pressure increases.

The region of increased cross-section 5 is shaped to give maximum energy recovery as the air-enriched slurry expands as it flows from the throat 3. Furthermore, the design and operating parameters of the venturi device 17 are selected to form air bubbles of optimal size for efficient oxygen mass transfer from the bubbles to the slurry. As a consequence, a minimal amount of air is required thereby reducing the operating costs. The design and operating parameters include slurry flow rate, air pressure, and the means of air injection into the slurry.

FIG. 3 illustrates a preferred embodiment of the venturi device 17 for use with a 3,000 liter capacity mixing tank 12 and a 75 mm diameter recycle line 6. The throat 3 of the venturi device 17 comprises an entrance cone 45 of 25° and an exit cone 47 of 7°. The diameter of the throat 3 is 25 mm and the diameter of the inlet and outlet ends 41, 43 is 75 mm. The holes 2 are located in the exit core 47 of throat 3 and are arranged in 3 circumferential rows spaced 5 mm apart with each row comprising 24×1 mm holes.

It will be clearly understood that the invention in its general aspects is not limited to the specific details referred to hereinabove.

The invention is now illustrated by way of reference to the following example.

A series of experiments was carried out on a conventional reactor comprising a 3,000 liter mixing tank stirred by an axial flow impeller and having air injection through a 1 mm drilled hole ring sparger mounted beneath the impeller and the preferred embodiment of the reactor of invention shown in FIG. 1 comprising a 3,000 liter mixing tank stirred by an axial flow impeller located in a draft tube and having a venturi device returning aerated slurry to a location above the axial flow impeller.

The tanks contained 8% w/v slurry of a pyrite/pyrhotite tails which was being bacterially leached with *Thiobacillus ferrooxidans*.

Figure 4:
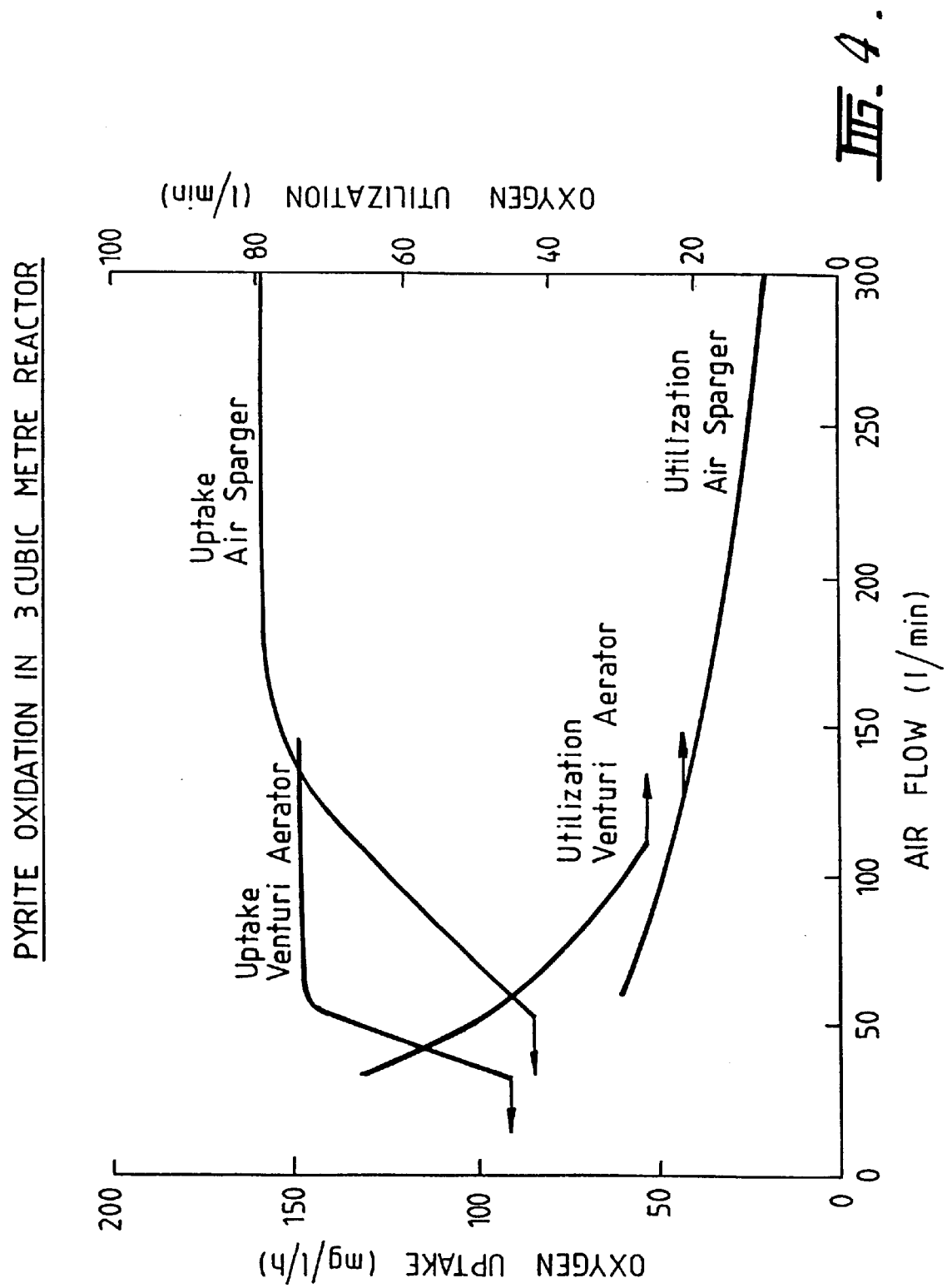
FIG. 4 is a graph of oxygen uptake and oxygen utilization versus air flow for the reactor shown in FIG. 1 and a conventional air agitated reactor.

The aeration performance of each tank was evaluated and the results are shown in FIG. 4.

FIG. 4 shows the relationships between:

(a) oxygen uptake in the slurry and air flow into the conventional reactor and the preferred embodiment of the reactor; and (b) oxygen utilisation and air flow into the conventional reactor and the preferred embodiment of the reactor.

The term "oxygen uptake" refers to the amount of oxygen that was transferred to the liquor and therefore is a direct measure of the extent of aeration. The term "oxygen utilisation" refers to the amount of oxygen that was transferred to the liquor as a percentage of the total amount of oxygen introduced into the reactor and therefore is a direct measure of the efficiency of the aeration.

With reference to FIG. 4, the term "air sparger" refers to the conventional reactor and the term "venturi aerator" refers to the preferred embodiment of the reactor.

The results in FIG. 4 show that the aeration performance of the preferred embodiment of the reactor was significantly better than that of the conventional reactor. By way of particular example, with the preferred embodiment of the reactor it was possible to aerate the slurry with 150 mg $O_2$/liter of slurry/hour with an air flow of 60 l/min and an oxygen utilization of 50% whereas with the conventional reactor it was only possible to aerate the slurry with 150 mg $O_2$/liter of slurry/hour with a considerably higher air flow of 150 l/min and a significantly lower oxygen utilization of 20%.

The power requirements to aerate each reactor type with a given volume of air were monitored and scaled up to values representing the anticipated power requirements for aeration in a 1,000 $m^3$ tank. The results are shown in Table 1.

TABLE 1

Comparison of Aeration Power Requirements

| Tank Configuration | Aeration Power (Wh/m³ of air) |
|---|---|
| Conventional Reactor with Air Sparger | 80 |
| Reactor of Invention with Draft Tube and Venturi | 20 |

The results indicate significant power savings with the preferred embodiment of the reactor compared with the conventional reactor. Specifically, the results show that the energy required per $m^3$ of air delivered was four-fold lower for the preferred embodiment of the reactor than for the conventional reactor. On the basis of the results of the energy utilization to achieve an $O_2$ uptake of 150 mg $O_2$/liter of slurry/hour discussed above, the energy required per $m^3$ of oxygen transferred was nine-fold lower for the preferred embodiment of the reactor than for the conventional reactor.

The preferred embodiment of the reactor of the invention has the following advantages over conventional reactor:

(i) The gas is supplied at low pressure or by natural aspiration, thereby eliminating the need for expensive high pressure gas compressors and reducing the reactor power requirements. Significantly, the agitator is used only to suspend the mineral particles and to circulate the aerated slurry.

(ii) The gas is injected or naturally aspirated at a point in the venturi device where the fluid velocity is high. This creates very small bubbles thus improving mass transfer of oxygen into solution. As a consequence, the operating costs are reduced because the air required for the reactor is minimised.

(iii) The aerated slurry is returned to the mixing tank above the impeller in a central draft tube at low pressure. As a consequence, operating costs are reduced because the pumping power required for circulating the slurry is minimised.

(iv) The capital cost of the reactor is minimised since there are less internal parts in the mixing tank. Furthermore, large reactors can be built leading to economies of scale.

(v) Maintenance costs and downtime are minimised since there are few parts to fail inside the mixing tank. Servicing the external components is simple since a single aeration device can be shut down for service without affecting the reactor's overall performance. Replacing a blocked aeration device can be done quickly with the minimum of interruption to the process.

(vi) The invention is suited for efficient gas supply and solids suspension in a gas-liquid-solid system or for efficient gas supply to a gas-liquid system. An example of the use of the invention is suspending and aerating a reacting slurry of mineral particles, as in bacterial leaching. Other uses include the bio-methanation of synthesis gas, aerobic digestion of sewage or other sludges and the production of synthetic rutile as in the Becher process. Its use, however, is not limited to these areas.

Many modifications may be made to the preferred embodiment of the reactor described herein without departing from the spirit and scope of the invention.

By way of example, whilst the impeller 14 is located near the top of the draft tube 13 in the preferred embodiment, the invention is not restricted to such an arrangement and the impeller 14 may be located at any suitable location along the length of the draft tube 13.

What is claimed is:

1. A reactor for introducing a gas into a fluid comprising a mixing tank for the fluid, a partition extending vertically in the tank and dividing the tank into at least two chambers, the partition adapted to allow the fluid to flow between the chambers at a lower region and an upper region of the tank, a pump for circulating the fluid downwards in one chamber and then upwards in the oilier chamber, an aerating circuit for aerating a part of the fluid circulating in the chambers in a separate circuit to that of a main stream of the fluid circulating in the chambers and for introducing the aerated fluid into the circulating fluid in the tank, the aerating circuit comprising:

(a) a means for withdrawing fluid from an upper region of the tank;

(b) a means for creating a region of reduced pressure in the fluid withdrawn from the tank;

(c) a means for introducing the gas into the withdrawn fluid in the region of reduced pressure at low pressure or by natural aspiration to aerate the fluid, the gas introduction means comprising a porous membrane, holes or jets; and (d) a means for introducing the aerated fluid into the circulating fluid in the tank at a location adjacent to and upstream from the pump.

2. The reactor defined in claim 1, wherein the partition comprises a draft tube adapted to be submerged in the fluid in the tank, the draft tube having an open upper end and an open lower end.

3. The reactor defined in claim 2, wherein the tank is cylindrical and the draft tube is located centrally in the tank to divide the tank into an inner chamber and an outer annular chamber.

4. The reactor defined in claim 1, wherein the pump comprises an axial flow pump.

5. The reactor defined in claim 4, wherein the axial flow pump is located within the confines defined by the partition.

6. The reactor defined in claim 5, wherein the axial flow pump comprises an impeller.

7. The reactor defined in claim 6, wherein the means for creating the region of reduced pressure in the fluid comprises a tubular member having a region of restricted cross-section for imparting a venturi effect to the fluid passing through the tubular member whereby the velocity in the fluid increases and the pressure of the fluid decreases in the region of restricted cross-section.

8. The reactor according to claim 2, wherein the draft tube has a constant diameter between the upper end and the lower end.

9. A reactor for introducing a gas into a fluid comprising a mixing tank for the fluid, a partition extending vertically in the tank and dividing the tank into at least two chambers, the partition adapted to allow the fluid to flow between the chambers at a lower region and an upper region of the tank, a pump located in one of the chambers for circulating the fluid downwards in one chamber and then upwards in the other chanter, an external circuit for aerating fluid separated from the fluid circulating in the tank and for introducing the aerated fluid into the fluid circulating in the tank, the external circuit comprising:

(a) a means for withdrawing fluid from an upper region of the tank;

(b) a means for creating a region of reduced pressure in the fluid withdrawn from the tank;

(c) a means for introducing the gas into the withdrawn fluid in the region of reduced pressure at Low pressure or by natural aspiration to aerate the fluid, the gas introducing means comprising a porous membrane, holes or jets; and (d) a means for introducing the aerated fluid into the fluid circulating in the tank at a location adjacent to and upstream from the pump.

10. The reactor defined in claim 9, wherein the partition comprises a draft tube adapted to be submerged in the fluid in the tank, the draft tube having an open upper end and an open lower end.

11. The reactor defined in claim 10, wherein the tank is cylindrical and the draft tube is located centrally in the tank to divide the tank into an inner chamber and an outer annular chamber.

12. The reactor defined in claim 11, wherein the pump comprises an axial flow pump.

13. The reactor defined in claim 12, wherein the axial flow pump is located in the draft tube.

14. The reactor defined in claim 13, wherein the axial flow pump comprises an impeller.

15. The reactor defined in claim 14, wherein the means for creating the region of reduced pressure in the fluid comprises a tubular member having a region of restricted cross-section for imparting a venturi effect to the fluid passing through the tubular member whereby the velocity in the fluid increases and the pressure of the fluid decreases in the region of restricted cross-section.

16. The reactor according to claim 10, wherein the draft tube has a constant diameter between the upper end and the lower end.

* * * * *